W. A. SMITH.
PERCUSSIVE TOOL.
APPLICATION FILED APR. 19, 1918.
1,311,925.
Patented Aug. 5, 1919.
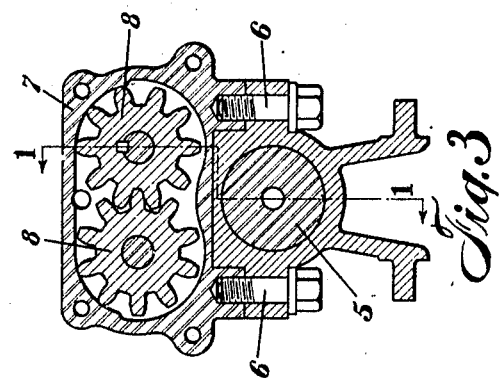
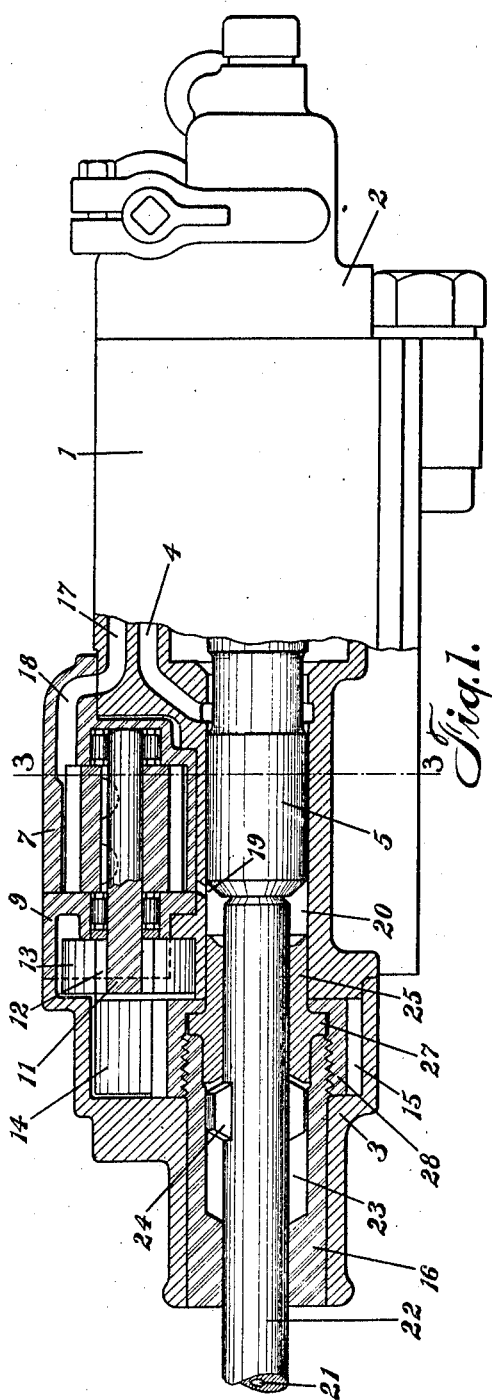
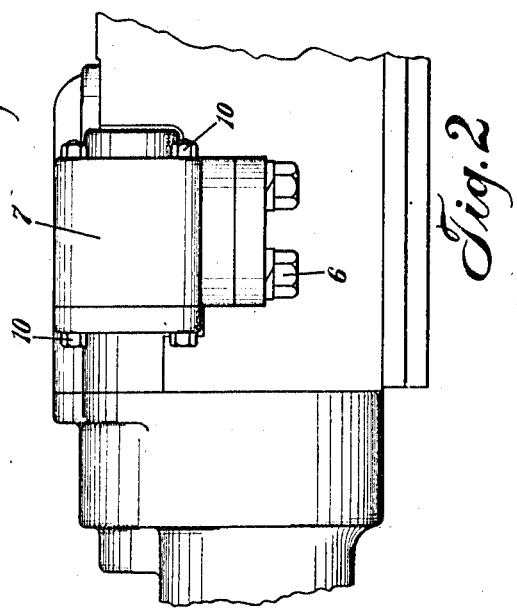
INVENTOR.
W. A. Smith
BY
Joseph N. Schofield
ATTORNEYS.

UNITED STATES PATENT OFFICE.

WILLIAM A. SMITH, OF EASTON, PENNSYLVANIA, ASSIGNOR TO INGERSOLL-RAND COMPANY, OF JERSEY CITY, NEW JERSEY, A CORPORATION OF NEW JERSEY.

PERCUSSIVE TOOL.

1,311,925.   Specification of Letters Patent.   Patented Aug. 5, 1919.

Application filed April 19, 1918. Serial No. 229,621.

*To all whom it may concern:*

Be it known that I, WILLIAM A. SMITH, a citizen of the United States, residing at Easton, in the county of Northampton and State of Pennsylvania, have invented a certain new and useful Improvement in Percussive Tools, of which the following is a specification.

This invention relates to percussive tools and in particular to percussive drills operated by fluid pressure and provided with a motor independent of the percussive element to provide rotation to the drill or other tool.

The objects of the present invention are to provide a tool of the above type in which the rotating motor is attached at one side of the cylinder body of the tool so that it may readily be dis-assembled and replaced in position in the drill without dis-assembling the other parts of the tool, to provide a casing in which all the rotating parts of the tool are contained which will be compact and permit simple means for connecting the rotating motor to the drill steel, as, for instance, by means of spur gears.

A further object of the invention is to provide a rotating chuck for the drill steel provided with a gear meshing with other gears intermediate the drill steel and rotating motor, the gear being formed on a collar by means of which the parts of the chuck are securely held together.

With these and other objects in view my invention consists in the features of construction and operation set forth in the following description and illustrated in the accompanying drawings, forming a part hereof, in which—

Figure 1 shows a longitudinal view of the drill, parts being broken away to more clearly show the construction;

Fig. 2, a view of the outside of a portion of the drill cylinder; and

Fig. 3, a cross-sectional view of the rotating motor taken on the line 3—3 of Fig. 1.

Referring more particularly to the drawings, 1 shows the cylinder body of a percussive tool built in accordance with the present invention. This cylinder body 1 extends from the back head 2 of the tool to the front head 3 in one integral part, the forward portion of which is somewhat reduced in size and is provided with conduits 4 by means of which the piston 5 is reciprocated within its cylinder in a well known manner.

Clamped to the cylinder body 1 of the tool by means of set screws 6 is a rotating motor casing 7 in which are contained the spur gears 8 meshing together, which form the rotating motor, the axes of these gears 7 and 8 extending longitudinally of the cylinder. In advance of the motor casing 7 is the spacing member 9 fastened to the motor casing 7 by means of bolts 10. This spacing member 9 serves to close the forward end of the motor casing 7 and also provides a part of the space required for the reducing gears 12 and 13. Through the spacing member 9 extends a shaft 11, extending longitudinally of the cylinder which is keyed to one of the gears 8 and at the forward end of this shaft 11 is a pinion gear 12 also fastened to the shaft 11 by any suitable means. Roller bearings are provided in which rotate the shafts upon which the gears 8 are mounted. The rearward roller bearings are contained within the motor casing 7 while the forward bearings are inclosed within the spacing member 9. Meshing with the pinion gear 12 is the larger gear 13 of a differential gear provided with a gear 14 which in turn meshes with the gear 15 provided on the rotating chuck 16. A conduit 17 extending from the fluid supply of the tool connects with a conduit 18 within the motor casing 7 for supplying fluid to the motor and an exhaust opening 19 permits the fluid after operating the motor to be admitted to the extreme forward end of the cylinder base 20 from which it may pass through the central hole 21 provided in the drill steel 22 to the bottom of the hole being drilled to expel the chips.

The rotating chuck 16 is made up of but three parts rigidly held together to form a simple unitary construction. These three parts are the chuck itself 16 which is provided with a hole throughout its length for the drill steel 22 and also slots 23 for the accommodation of the usual lugs 24 with which the drill steel 22 is provided. Fitting within the rearward portion of the chuck 16 is a sleeve 25 having a hole throughout its length through which passes the shank 26 of the drill steel 22. This sleeve 25 is provided with a flange 27 by means of which it may be held securely in alinement with the chuck 16 by means of a collar 28, the collar 28 being threaded or otherwise secured to the chuck 16 as shown clearly in Fig. 1.

Upon the outer face of the collar 28 are provided gear teeth 15 which mesh with the gear 14 as explained above, and by means of which the chuck 16 is rotated.

From the above it will be seen that a simple, compact and convenient device has been provided whereby a percussive drill having independent means for rotating is formed, all of the rotating parts of which are within the casing 7, the spacing member 9, and front head.

It is to be understood that the present showing and description disclose only one specific embodiment of the present invention, and that other forms and modifications are included within the spirit and scope of the invention, as expressed in the appended claims.

What I claim is:

1. In a cylinder for percussive tools, in combination, a cylinder body, a motor casing bolted thereto at one side of said cylinder body, a spacing member attached to said motor casing at its forward end and a front head joining said spacing member and cylinder body.

2. In a cylinder for percussive tools, having a reduced front portion, in combination, a cylinder body, a motor casing bolted thereto at its forward reduced portion, a spacing member attached to said motor casing at its forward end and a front head joining said spacing member and cylinder body.

3. In a cylinder for percussive tools, in combination, a cylinder body, a motor casing bolted thereto at one side of said cylinder body, a pair of spur gears contained within said motor casing comprising a rotating motor, a spacing member attached to said motor casing at its front end and a front head joining said spacing member and cylinder body, said spacing member and front head containing a reducing gear fastened to said motor and meshing with a rotating chuck within said front head.

4. In a cylinder for percussive tools, in combination, a cylinder body, a motor casing bolted thereto at one side of said cylinder body, a pair of spur gears contained within said motor casing comprising a rotating motor, the axes of said gears extending longitudinally, a spacing member attached to said motor casing at its front end and a front head joining said spacing member and cylinder body, said spacing member and front head containing a reducing gear fastened to said motor and meshing with a rotating chuck within said front head.

5. In a rotating chuck for percussive tools, in combination, a sleeve adapted to engage the shank of a drill steel, a front sleeve adapted to engage a drill steel, one of said sleeves having a flange, and a geared collar threaded to one of said sleeves and engaging the flange of the other sleeve whereby said sleeves and collar are held firmly together.

6. In a rotating chuck for percussive tools, in combination, a sleeve adapted to engage the shank of a drill steel, a front sleeve adapted to engage a drill steel, said first mentioned sleeve having a flange, and a collar provided with a gear on its outer face and threaded to said front sleeve and engaging the flange of said first mentioned sleeve whereby said sleeves and collar are held firmly together.

In testimony whereof, I have hereunto set my hand.

WILLIAM A. SMITH.